United States Patent [19]

Weder et al.

[11] Patent Number: 5,544,469
[45] Date of Patent: * Aug. 13, 1996

[54] WRAPPING MATERIAL HAVING AN EXTENSION FOR DESIGN INDICIA FOR WRAPPING FLOWER POTS AND FLORAL ARRANGEMENTS AND METHODS

[75] Inventors: Donald E. Weder, Highland; Lisa A. Straeter, Breese, both of Ill.

[73] Assignee: Southpac Trust International, Inc., Highland, Ill.

[ * ] Notice: The portion of the term of this patent subsequent to May 12, 2009, has been disclaimed.

[21] Appl. No.: 973,471

[22] Filed: Nov. 9, 1992

Related U.S. Application Data

[63] Continuation-in-part of Ser. No. 893,586, Jun. 2, 1992, Pat. No. 5,181,364, and a continuation-in-part of Ser. No. 865,563, May 21, 1992, Pat. No. 5,245,814, which is a continuation of Ser. No. 649,379, Jan. 31, 1991, Pat. No. 5,211,638, which is a continuation of Ser. No. 249,761, Sep. 26, 1988, abandoned, which is a continuation of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.⁶ .............................. B65B 61/00; B65B 11/02
[52] U.S. Cl. ...................................... 53/410; 53/399
[58] Field of Search .................... 53/397, 399, 410, 53/415, 420, 449, 462, 465; 47/72

[56] References Cited

U.S. PATENT DOCUMENTS

| 931,631 | 8/1909 | Milhado | 53/399 X |
|---|---|---|---|
| 1,525,015 | 2/1925 | Weeks | 53/465 UX |
| 1,821,564 | 9/1931 | Muller | 53/399 |
| 1,868,853 | 7/1932 | Sievers | 47/72 |
| 2,111,129 | 3/1938 | Rittenhouse | 47/72 |
| 2,340,373 | 2/1944 | Gardner | 47/72 X |
| 2,468,695 | 4/1949 | Wallace et al. | 53/462 X |
| 3,271,922 | 9/1966 | Wallerstein et al. | 53/3 |
| 3,508,371 | 4/1970 | Wallerstein et al. | 53/3 |
| 3,556,389 | 1/1971 | Gregoire | 47/72 |
| 3,962,503 | 6/1976 | Crawford | 47/72 X |
| 4,333,267 | 6/1982 | Witte | 47/72 X |
| 4,546,875 | 10/1985 | Zweber | 53/465 X |
| 4,713,839 | 12/1987 | Peppiatt | 53/413 X |
| 4,986,396 | 2/1991 | Weder et al. | 53/397 |
| 5,007,229 | 4/1991 | Weder et al. | 53/397 |
| 5,079,900 | 1/1992 | Pinckney et al. | 53/415 X |
| 5,105,599 | 4/1992 | Weder | 53/399 |
| 5,111,637 | 5/1992 | Weder et al. | 53/397 |
| 5,111,638 | 5/1992 | Weder | 53/465 X |
| 5,161,348 | 11/1992 | Weder | 53/399 |
| 5,181,364 | 1/1993 | Weder | 53/465 X |
| 5,245,814 | 9/1993 | Weder | 53/462 X |
| 5,293,715 | 3/1994 | Kaz | 47/72 |
| 5,307,605 | 5/1994 | Straeter | 53/397 |
| 5,315,785 | 5/1994 | Avot et al. | 47/72 |

*Primary Examiner*—Horace M. Culver
*Attorney, Agent, or Firm*—Dunlap & Codding, P.C.

[57] ABSTRACT

A wrapping material for wrapping a floral arrangement, a flower pot, or for forming a flower pot, comprising a sheet of material, an extension of the sheet of material attached to the sheet of material, the extension having design indicia thereon, wherein the sheet of material is sized to wrap about and substantially surround and encompass a floral arrangement, a flower pot, or contain a floral arrangement or potted plant. Methods of using the wrapping material to wrap a floral arrangement, a flower pot, and to form a flower pot.

20 Claims, 9 Drawing Sheets

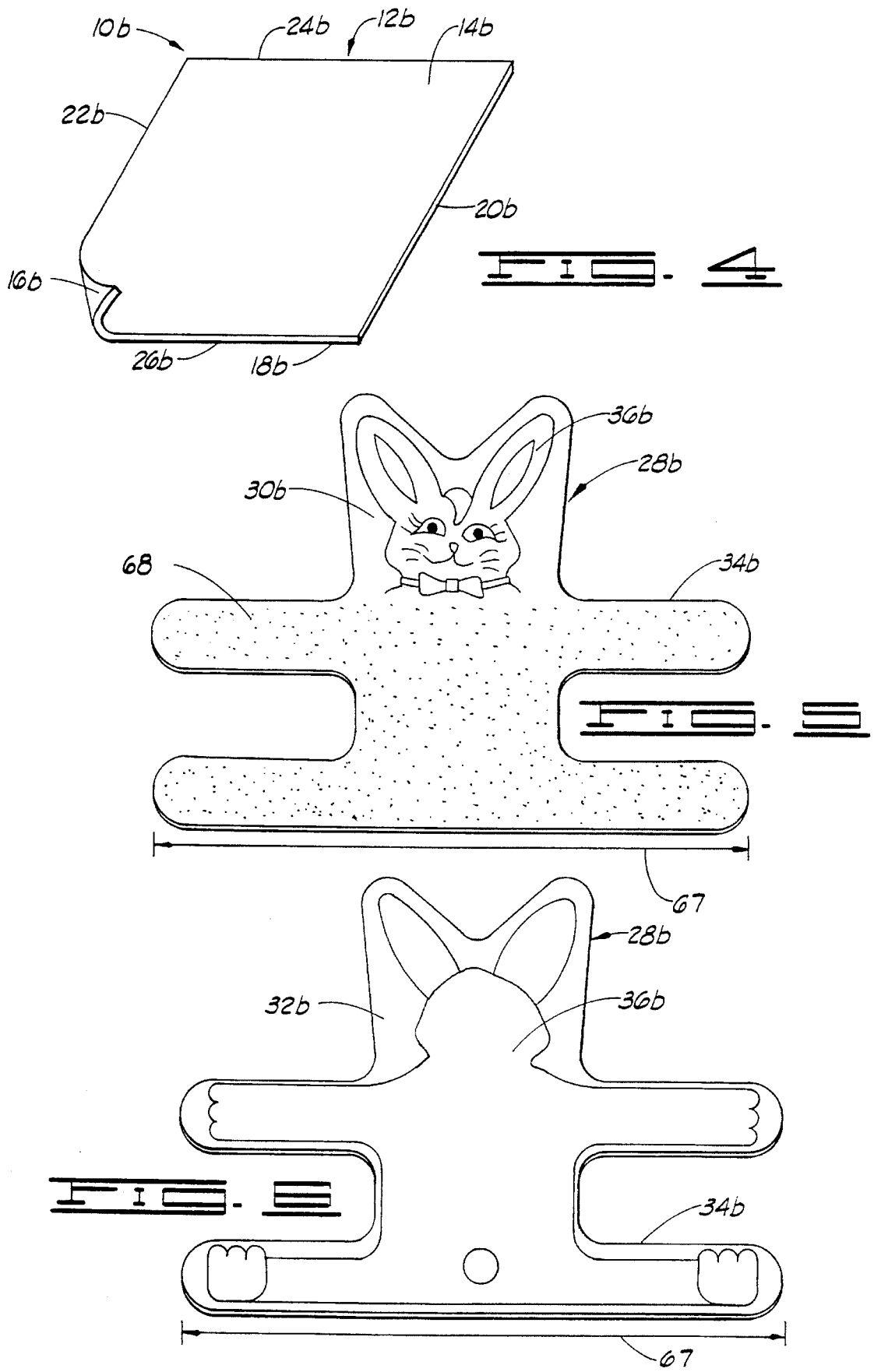

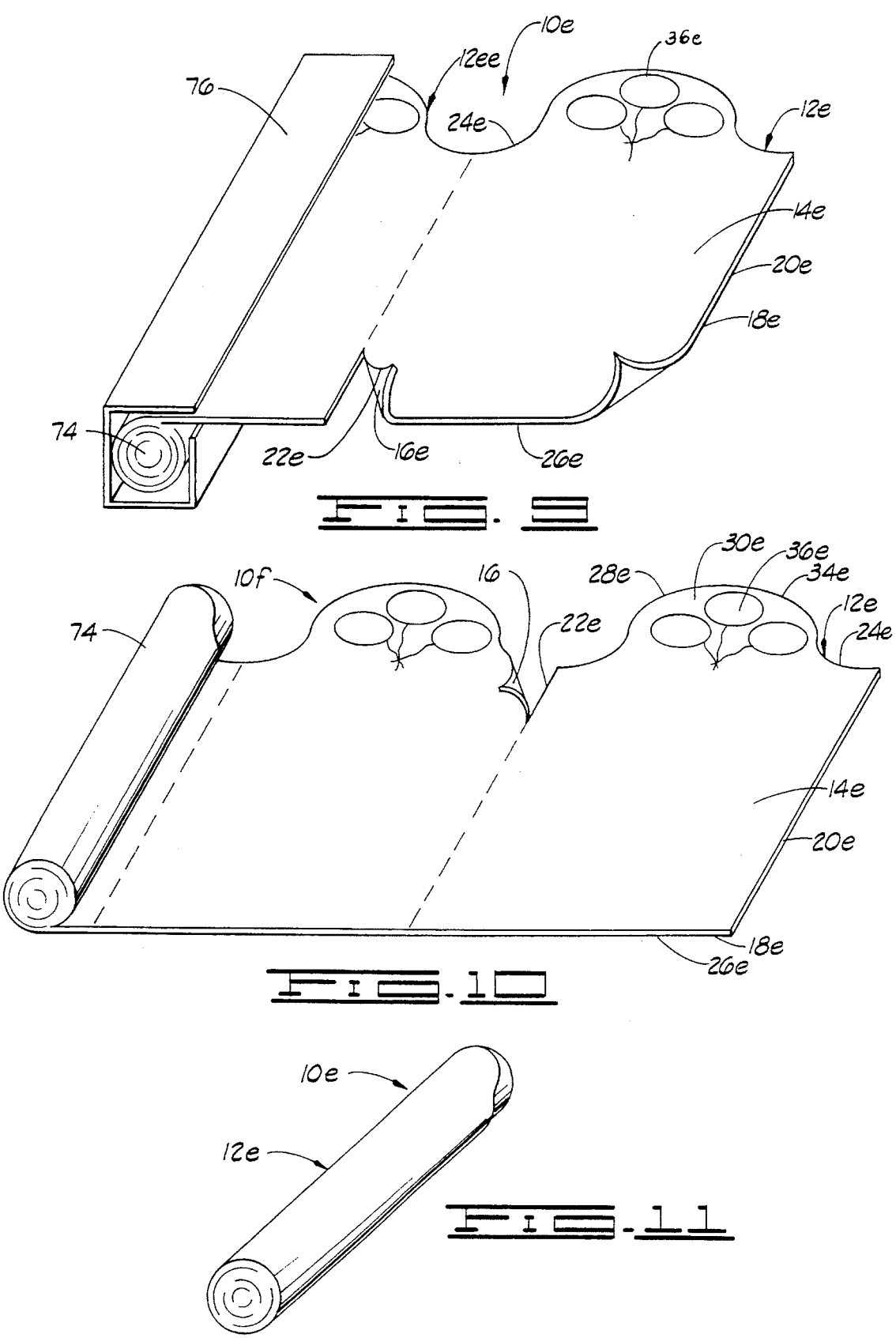

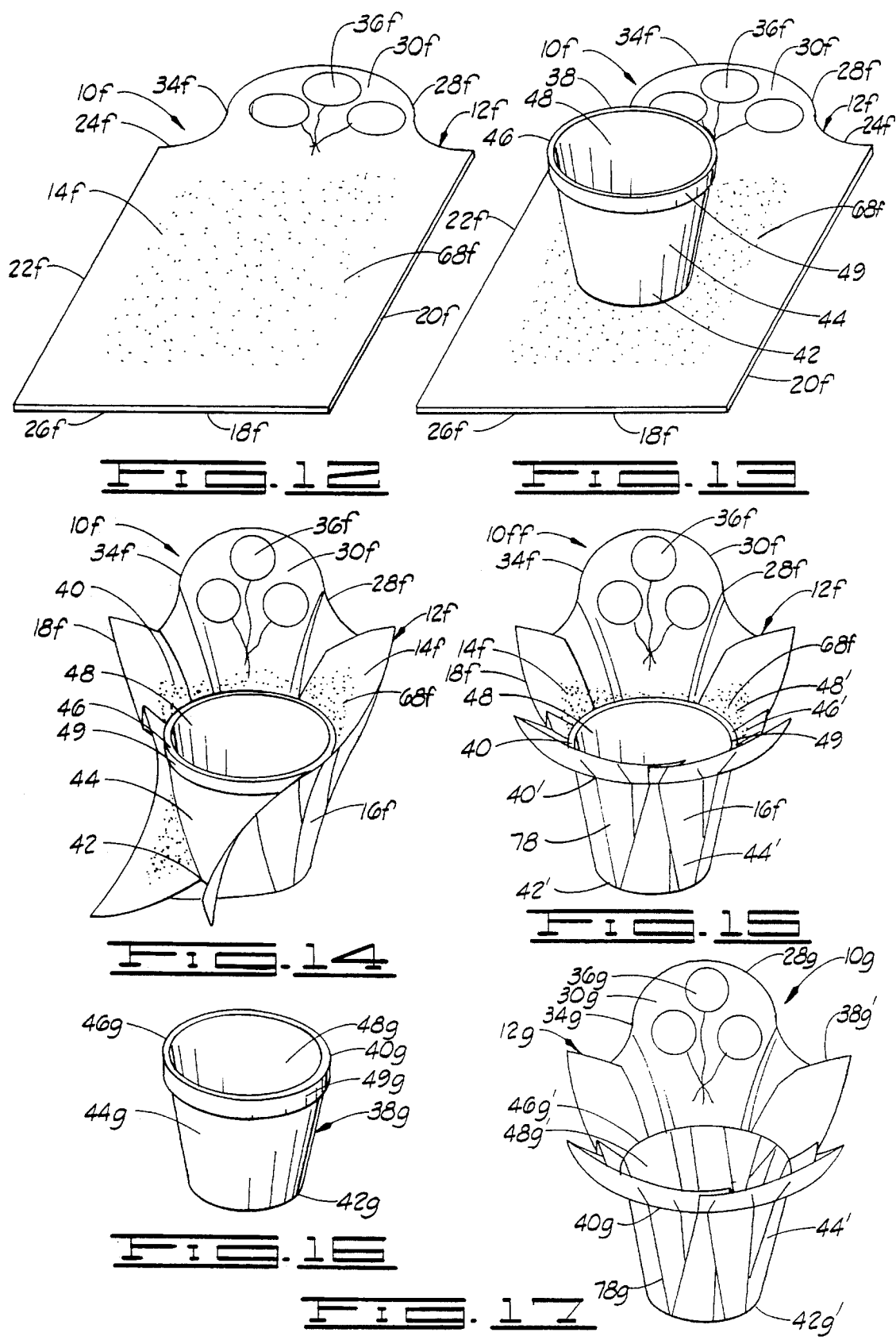

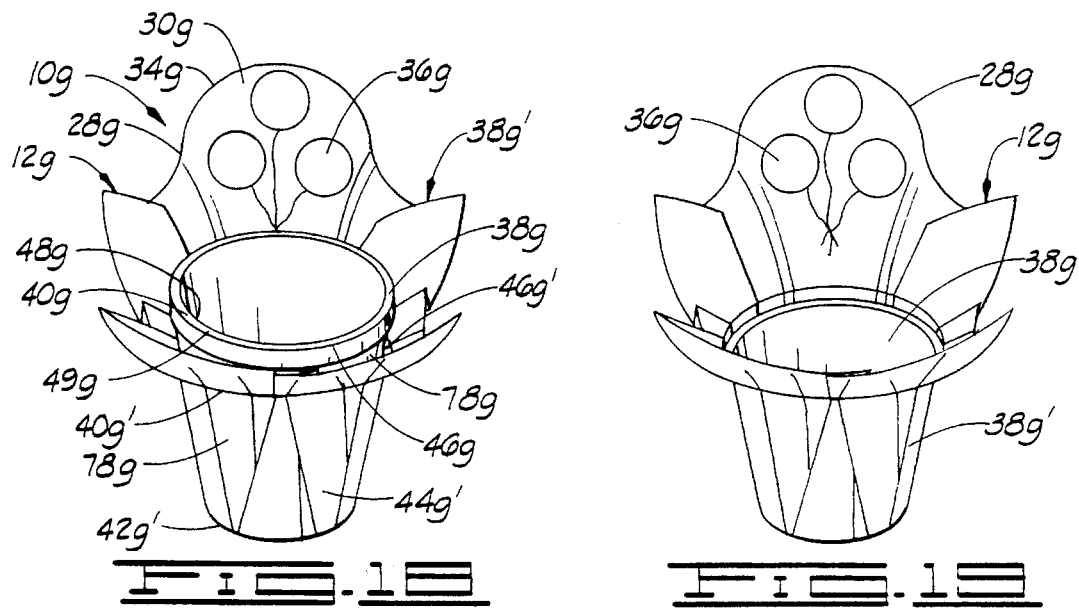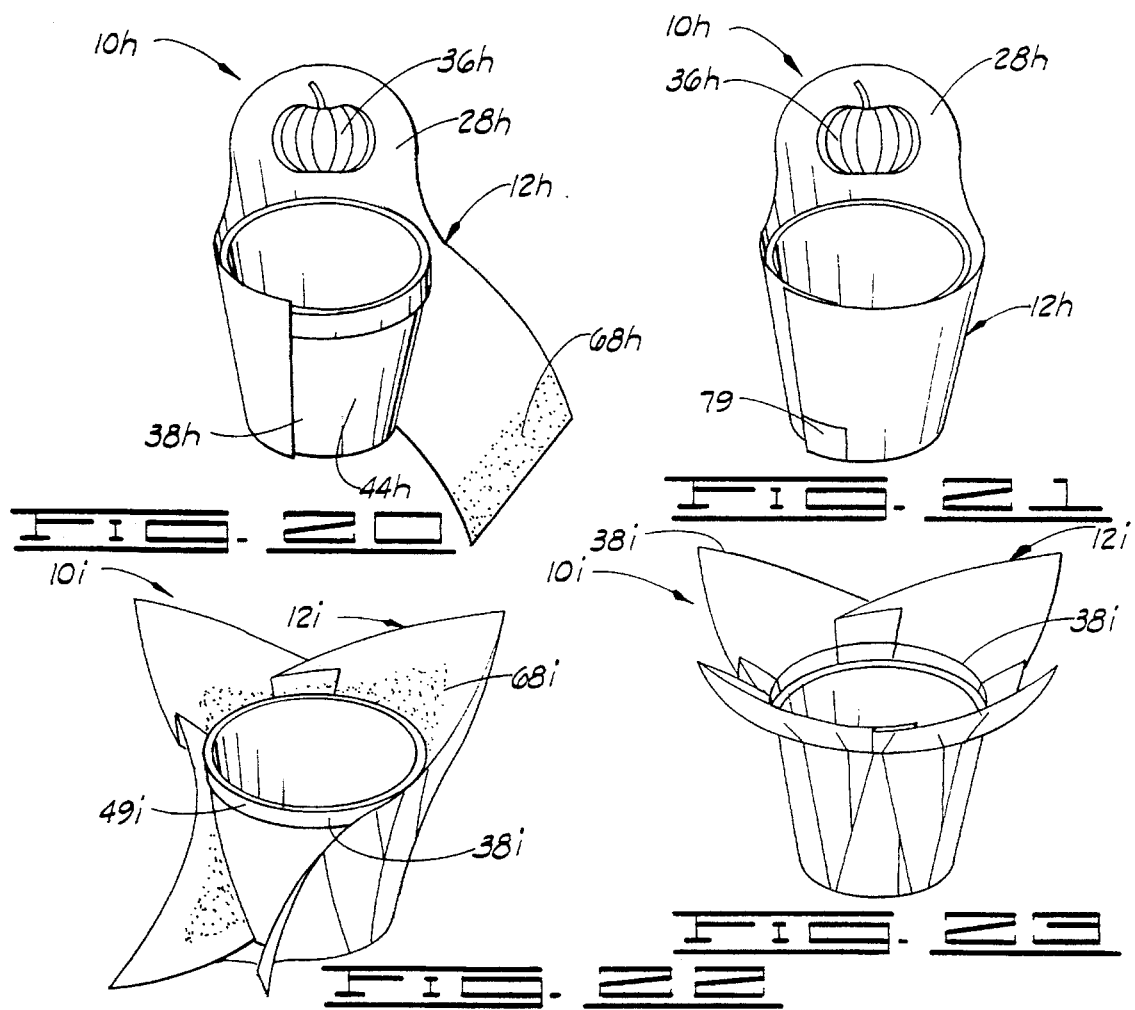

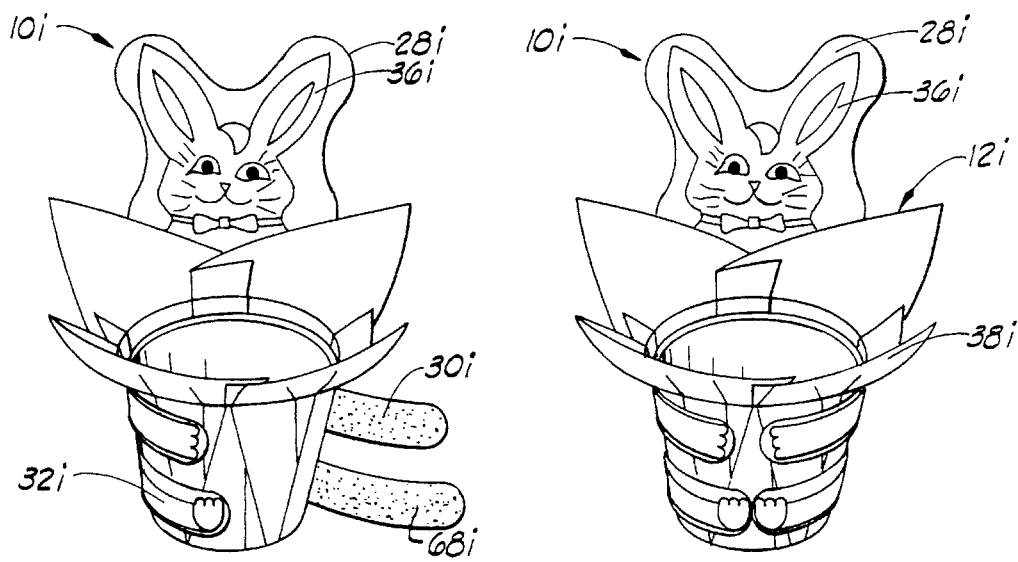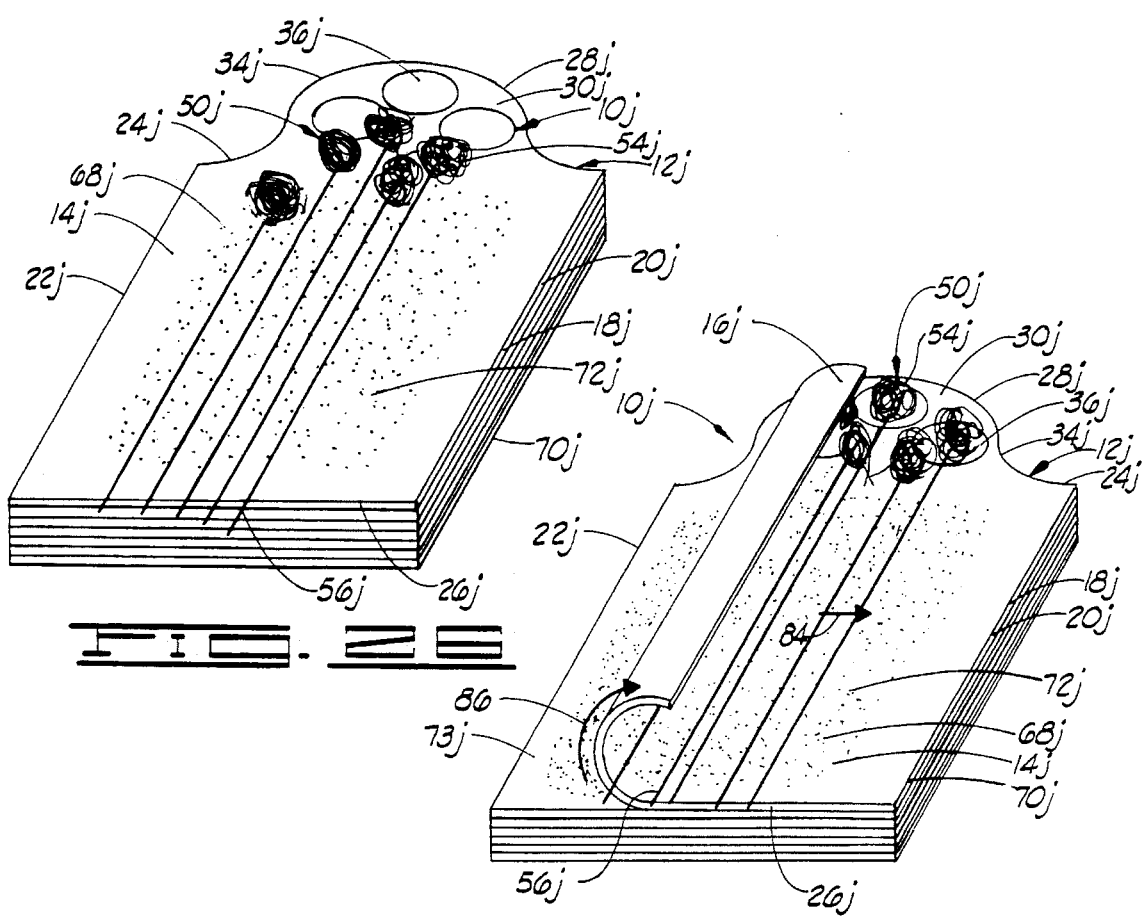

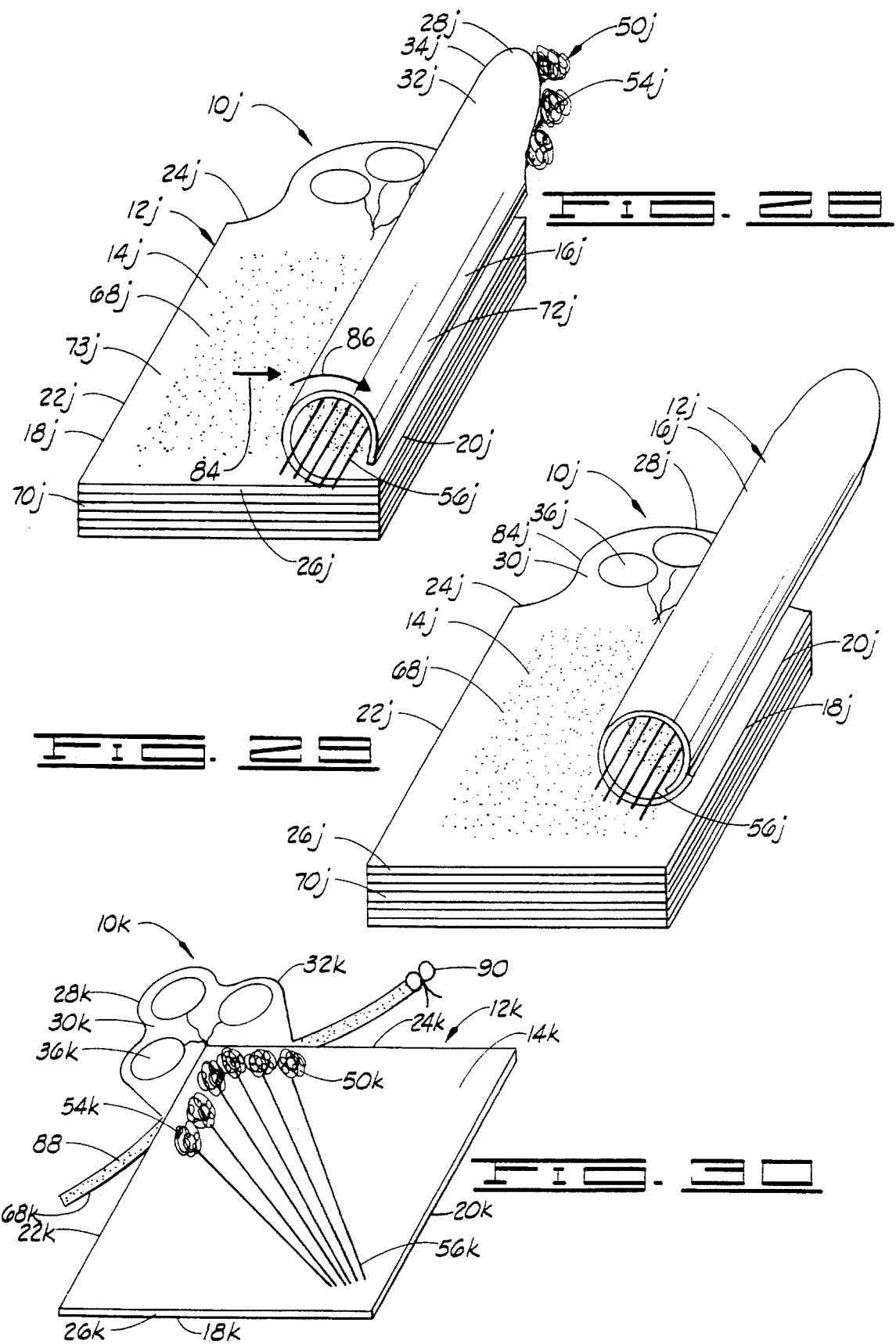

WRAPPING MATERIAL HAVING AN EXTENSION FOR DESIGN INDICIA FOR WRAPPING FLOWER POTS AND FLORAL ARRANGEMENTS AND METHODS

CROSS-REFERENCE TO RELATED APPLICATIONS

This application is a continuation-in-part of application, U.S. Ser. No. 07/865,563, filed May 21, 1992, entitled METHOD FOR WRAPPING AN OBJECT WITH A MATERIAL HAVING PRESSURE SENSITIVE ADHESIVE THEREON, now U.S. Pat. No. 5,245,814, which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now ABANDONED; and this application is also a continuation-in-part of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364, which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now ABANDONED, which is a continuation of U.S. Pat. No. 07/502,358, filed Mar. 29, 1990, entitled WRAPPING A FLORAL GROUPING WITH SHEETS HAVING ADHESIVE OR COHESIVE MATERIAL APPLIED THERETO, now ABANDONED, which is a continuation-in-part of U.S. Ser. No. 07/391,463, filed Aug. 9, 1989, entitled Adhesive Applicator Dispenser now ABANDONED, which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now ABANDONED.

FIELD OF THE INVENTION

This invention generally relates to wrapping materials, and, more particularly, to wrapping materials for wrapping flower pots and foil arrangements, and methods of using same.

BRIEF DESCRIPTION OF THE DRAWINGS

FIG. 4 is a perspective view of a modified wrapping material constructed exactly like the wrapping material of FIGS. 1–2, but showing the sheet of material with the extension detached.

FIG. 5 is a perspective view of a modified extension constructed exactly like the extension of FIGS. 1–2, but showing the extension separated from the sheet of material, and showing the upper surface of the extension, the extension being a different configuration.

FIG. 6 is a perspective view of the extension of FIG. 5, but showing the lower surface thereof.

FIG. 9 is a perspective view of a modified wrapping material constructed exactly like the wrapping material of FIG. 3, but showing a plurality of sheets of material contained within a roll of sheets of material which is contained within a dispenser.

FIG. 10 is a perspective view of a modified wrapping material constructed exactly like the wrapping material of FIG. 3, but showing a plurality of sheets of material contained within a roll.

FIG. 11 is a perspective view of a modified wrapping material constructed exactly like the wrapping material of FIG. 3, but showing a single sheet of material contained within a roll.

FIG. 12 is a perspective view of a modified wrapping material constructed exactly like the wrapping material of FIG. 3, but showing a bonding material disposed thereon.

FIG. 13 is a perspective view of the wrapping material of FIG. 12, but showing a flower pot disposed thereupon.

FIG. 14 is a perspective view of the wrapping material of FIG. 12, but showing a partially wrapped flower pot.

FIG. 15 is a perspective view of the wrapping material of FIG. 12, but showing a wrapped flower pot.

FIG. 16 is a perspective view of a flower pot.

FIG. 17 is a perspective view of a pre-formed flower pot cover constructed from wrapping material exactly like the wrapping material shown in FIG. 3.

FIG. 18 is a perspective view of the pre-formed flower pot cover of FIG. 17, but showing a flower pot partially disposed therein.

FIG. 19 is a perspective view of the pre-formed flower pot cover of FIG. 17, but showing a flower pot disposed in the pre-formed flower pot cover.

FIG. 20 is a perspective view of the wrapping material of FIG. 7, but showing a partially wrapped flower pot.

FIG. 21 is a perspective view of the wrapping material of FIG. 7, but showing a wrapped flower pot.

FIG. 22 is a perspective view of the wrapping material of FIG. 4, but showing a partially wrapped flower pot.

FIG. 23 is a perspective view of the wrapping material of FIG. 4, but showing a wrapped flower pot.

FIG. 24 is a perspective view of the wrapped flower pot of FIG. 23, but showing the extension of FIGS. 5–6 partially wrapped about the flower pot cover.

FIG. 25 is a perspective view of the wrapped flower pot of FIG. 23, but showing the extension of FIGS. 5–6 wrapped about the flower pot cover.

FIG. 26 is a perspective view of the wrapping material of FIG. 8, but showing a floral arrangement disposed thereon.

FIG. 27 is a perspective view of the wrapping material of FIG. 26, but showing a partially wrapped floral arrangement.

FIG. 28 is a perspective view of the wrapping material of FIG. 27, but showing a partially wrapped floral arrangement.

FIG. 29 is a perspective view of the wrapping material of FIG. 27, but showing a wrapped floral arrangement.

FIG. 30 is a perspective view of a modified wrapping material constructed exactly like the wrapping material of FIGS. 1–2, but showing an extension which is attached separately, and showing the upper surface of a portion of the extension, the extension being a different configuration than the extension shown in FIGS. 1–2, and having a first portion and a second portion which extend beyond the outer periphery of the wrapping material, a floral arrangement disposed on the wrapping material.

DESCRIPTION OF THE PREFERRED EMBODIMENTS

Significant characteristics of a gift of fresh flowers, a floral arrangement (with or without a container), or a potted plant is both the visual aesthetic effect provided by the plant, floral arrangement, or fresh flowers, and, additionally, the aesthetic effect provided by any wrapping material which contains such items. Therefore, the wrapping material provides an important element in the overall aesthetic experience of receiving fresh flowers, a floral arrangement, or a plant. Obviously, it would be desirable to enhance and/or extend this portion of the aesthetic enjoyment of such items.

The present invention contemplates a wrapping material for wrapping the above-defined items. The wrapping material comprises an extension which contains design indicia, which may be whimsical, representative of a holiday, a birthday, or the like. Such an extension and design indicia thereon, contained as part of the wrapping material, can be used to enhance the visual aesthetic effect of fresh flowers, a floral arrangement, or a potted plant, and may additionally be used to personalize the gift to the recipient for a special occasion, such as a birthday, an anniversary, a holiday, such as valentine's day, or other special occasion. Such a wrapping material enhances the overall aesthetic effect produced by such items.

Figure 1:
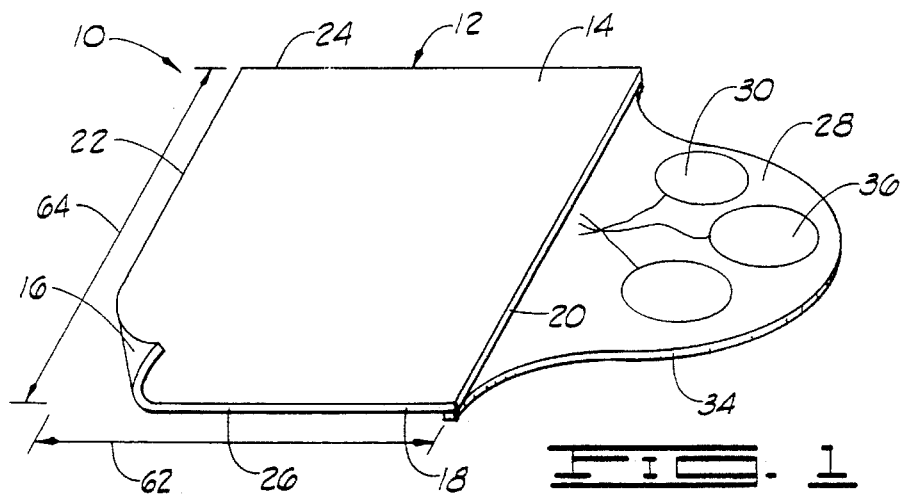
FIG. 1 is a perspective view of the wrapping material of the present invention showing the upper surface, and showing an extension having a design indicia thereon which is attached separately.
Figure 2:
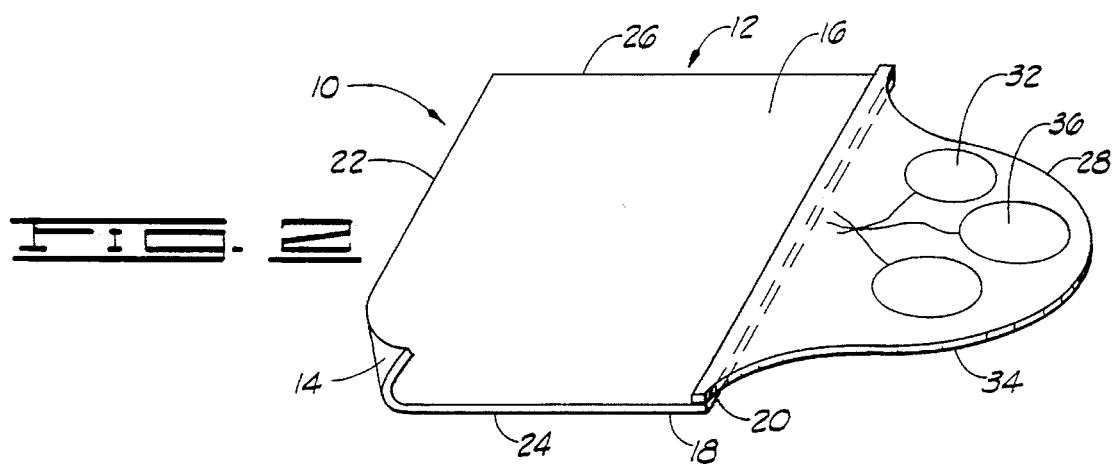
FIG. 2 is a perspective view of the wrapping material of FIG. 1, but showing the lower surface thereof.

The Embodiment of FIGS. 1–2

Figure 3:
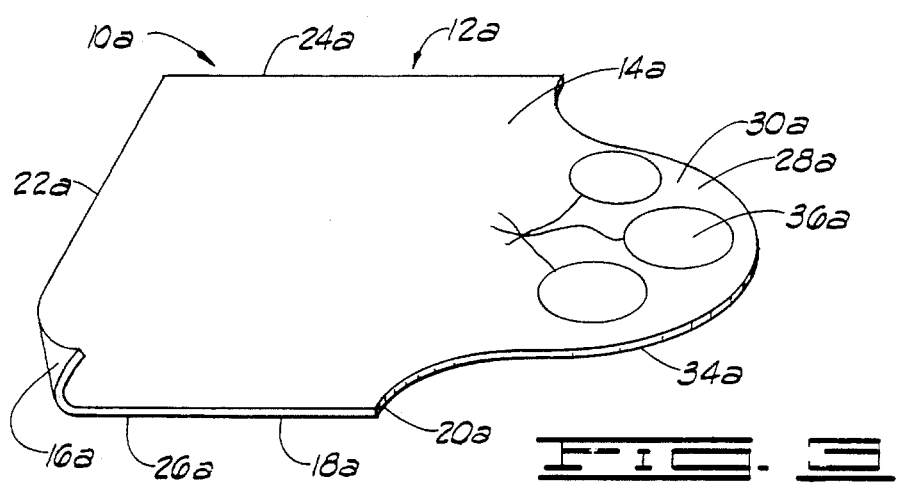
FIG. 3 is a perspective view of a modified wrapping material constructed exactly like the wrapping material of FIGS. 1–2, but showing the extension as an integral part of the wrapping material.

Referring to FIGS. 1–2, designated generally by the reference numeral 10 is a wrapping material which is constructed in accordance with the present invention. The wrapping material 10 comprises at least one sheet of material 12. The sheet of material 12 has an upper surface 14, a lower surface 16 (one edge of the sheet of material lifted for illustration purposes only), and an outer periphery 18. In the embodiment show in FIG. 1, the outer periphery 18 of the sheet of material 12 comprises a first side 20, a second side 22, a third side 24, and a fourth side 26. It will be appreciated, however, that the sheet of material 12 may comprise a variety of shapes. The sheet of material 12 also has an extension 28. The extension 28 connects at or near the outer periphery 18 of the sheet of material (FIGS. 1 and 2), or, alternatively, may form a non-separate, integral part of the sheet of material 12 (FIG. 3). The extension 28 has an upper surface 30, a lower surface 32 and an outer periphery 34.

Located on at least a portion of the extension 28 is a design indicia 36. The extension 28 may also comprise one or more shape sustaining elements (not shown). "Shape sustaining elements" means wire or rods, made of metal or plastic (synthetic resinous plastic), or a combination thereof, which imparts sufficient shape to permit the extension 28 to extend above a floral arrangement, flower pot, or potted plant as described in greater detail below. Such a shape sustaining element may be attached to the extension 28 and/or the sheet of material 12 via a bonding material, the element laminated between extensions 28 and/or sheets of material 12, or by any method described herein or known in the art. It will be appreciated that the extension 28 is connected to the sheet of material 12 by any method described herein.

The sheet of material 12 is utilized to wrap a flower pot 38 (FIGS. 12–15). The flower pot 38 (FIG. 13) comprises an upper end 40, a lower end 42, and an outer surface 44. The upper end has an opening 46 that is formed in the flower pot 38, with a portion of the flower pot opening 46 intersecting the upper end 40 of the flower pot 38 forming an inner surface 48. A rim 49, namely a thickened "collar," surrounds the round opening 48, and extends circularly around the upper end 40 of the flower pot 38. The flower pot opening 46 is sized and shaped for receiving a floral arrangement 50 or a plant 52 having potted soil thereabout (potted plant), or combinations thereof (not shown), the floral arrangement 50 or plant 52 being retained in the flower pot opening 46 by the flower pot 38.

The term "flower pot" means any type of floral container used to hold a floral arrangement 50 or a potted plant 52. Examples of flower pots 38 used in accordance with the present invention include clay flower pots, plastic flower pots, and the like.

The sheet of material 12 is also used to wrap fresh flowers, or a floral arrangement 50. "Floral arrangement" is used herein and means fresh cut flowers, artificial flowers, other fresh and/or artificial plants or other floral materials and may include other secondary plants and/or ornamentation which add to the aesthetics of the overall floral arrangement 50. The floral arrangement 50 comprises a flower portion 54 which may comprise either a bloom or foliage portion and a stem portion 56, However, it will be appreciated that the floral arrangement 50 may consist of only a single bloom or only foliage (not shown).

"Potted plant" is used herein means any living plant which is contained within a flower pot 38 as described herein. Such a potted plant 52 has a flower end 58 (not shown) which may comprise blooms, or merely foliage, or both, and a root end 60 (not shown).

In the embodiment of FIG. 1, the sheet of material 12 is square, and the extension 28 is rounded on one portion of the outer periphery 34, and straight on the other portion of the outer periphery 34. It will be appreciated, however, that any shape or size of sheet of material 12 may be used to wrap a flower pot 38 or a floral arrangement 50 as long as it is sufficiently sized and shaped to wrap and encompass the flower pot 38 or floral arrangement 50; similarly, any shape or size of extension 28 may be utilized and attached to the sheet of material 12. For example, the sheet of material 12 and/or the extension 28 may also comprise other geometric and nongeometric shapes, i.e., rectangular, round, oval, octagonal, asymmetrical, abstract, flower-shaped, and the like. And multiple sheets of material 12 and/or extensions 28 may be used. Moreover, when multiple sheets of material 12 and/or multiple extensions 28 are used in combination, the sheets of material 12 and/or the extensions 28 need not be uniform in size or shape. Finally, it will be appreciated that the sheet of material 12 shown in all embodiments herein is substantially flat.

The sheet of material 12 may be constructed of a single sheet of material 12 or a plurality of sheets of material 12; similarly, the extension 28 may be constructed of a single extension 28 or a plurality of extensions 28. Any thickness of the sheet of material 12 and/or the extension 28 may be utilized in accordance with the present invention as long as the sheet of material 12 may be wrapped about at least a portion of a flower pot 38 or a floral arrangement 50, as described herein. The sheet of material 12 and/or the extension 28 has a thickness of less than about 1 mil to about 30 mils. Typically, the sheet of material 12 and/or the extension 28 has a thickness in a range of less than about 0.2 mils to about 10 mils. In a preferred embodiment, the sheet of material 12 and the extension 28 is constructed from one sheet of man-made organic polymer film having a thickness in a range of from less than about 0.5 mils to about 2.5 mils. It will be appreciated that the extension 28 may comprise a different thickness than the sheet of material 12, or vice versa.

The sheet of material 12 is constructed from any suitable material that is capable of being wrapped about a flower pot 38 or floral arrangement 50. Preferably, the sheet of material 12, and the extension 28, comprises paper (untreated or treated in any manner), cellophane, foil, man-made organic polymer film, fiber (woven or nonwoven or synthetic or natural), cloth (woven or nonwoven or natural or synthetic), burlap, or any combination thereof. It will be appreciated that the sheet of material 12 may be constructed from a different material than that used to construct the extension 28.

The term "man-made organic polymer film" means a man-made resin such as a polypropylene as opposed to naturally occurring resins such as cellophane. A man-made organic polymer film is relatively strong and not as subject to tearing (substantially nontearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one such man-made organic polymer film is a polypropylene film.

The term "polymer," as used herein means any polymer film. For example, but not by way of limitation, one polymer film is a polypropylene film. Another example of a polymer film, but not by way of limitation, is cellophane.

The sheet of material 12 and/or the extension 28 may vary in color. Further, the sheet of material 12 and/or the extension 28 may consist of designs which are printed, etched, and/or embossed; in addition, the sheet of material 12 and/or the extension 28 may have various colorings, coatings, flocking and/or metallic finishes, or be characterized totally or partially by pearliest, translucent, transparent, iridescent, or the like, characteristics. Each of the above-named characteristics may occur alone or in combination. Moreover, each surface of the sheet of material 12 and/or the extension 28 may vary in the combination of such characteristics.

The sheet of material 12 has a width 62 (FIG. 1) extending generally between the first side 20 and the second side 22, respectively, sufficiently sized whereby the sheet of material 12 can be wrapped about and substantially surround and encompass a flower pot 38 or a floral arrangement 50. The sheet of material 12 has a length 64 (FIG. 1) extending generally between the third side 24 and the fourth side 26, respectively, sufficiently sized whereby the sheet of material 12 extends over a substantial portion of the flower pot 38 or the floral arrangement 50 when the sheet of material 12 has been wrapped about the flower pot 38 or the floral arrangement 50 in accordance with the present invention shown and described in detail herein. In two embodiments (FIGS. 5 and 6), the extension 28 has a width 67 which permits the extension to extend substantially around a flower pot 38 or a floral arrangement 50.

The extension 28 of the sheet of material 12 further comprises at least one design indicia 36. "Design indicia" as used herein includes (but is not limited to) fanciful designs such as rabbits, hearts, balloons, pumpkins, clover, eggs, chicks, tombstones, and the like. Additional examples of design indicia include flowers (such as roses, daisies, lilacs), plants (such as fruits, vegetables, clover, grasses, trees), mammals (rabbits, dogs, cats, and the like), fictional characters (such as cartoon characters), non-mammals (birds, alligators, and the like), or real characters (such as a photograph of an individual), and the like. Design indicia 36, as used herein, may also includes printed information, including letters, numbers, and other symbols. Design indicia 36 may vary between the upper surface 30 and the lower surface 32 of the extension 28 (FIGS. 5 and 6).

Design indicia 36, as used herein, may also include care tag information (not shown). Care tags have traditionally been attached to stakes and disposed in the potting soil surrounding a plant, or, alternatively, connected to the plant itself. Such care tags included printed information, and, at times, various pictures of the potted plant 52, along with the recommended care of the floral arrangement 50 or potted plant 52, such as information and recommendations for watering, sunlight exposure, fertilization, cutting and the like. The care tag information, with or without a picture of the potted plant 52 or floral arrangement 50, may form at least a portion of the design indicia 36 on the extension 28. Care tags, and care tag information, are commercially available, and are well-known in the art. Finally, the design indicia 36 on the extension 28 may also include a UPC (Uniform Product Code) mark (namely, a bar code marking on the product, which may be automatically scanned by special equipment, thus permitting the price of the flower pot 38 or floral arrangement 50 to be automatically registered on a cash register, or other registering means). Such UPC marks are well known in the art, and are commercially available. Alternatively, the UPC mark may be placed on the sheet of material 12 in any location, by any means described herein or known in the art.

The design indicia 36 may be disposed upon the extension 28 and, additionally in some instances, the sheet of material 12 by use of a dye, ink, and/or pigment. Such dyes, inks, and/or pigments are known in the art and are commercially available, and may be disposed upon or incorporated in the extension 28 and/or the sheet of material 12 by any method described herein or known in the art. That is, the design indicia 36 may be painted upon the extension 28, sprayed upon the extension 28, printed upon the extension 28, or incorporated upon the extension 28 during the extrusion process. The extrusion of polymer films is well-known in the art.

When the extension 28 comprises a separate sheet of material, the extension 28 is attached to the sheet of material 12 by use of a bonding material 68. The term "bonding material" as used herein means an adhesive, preferably a pressure sensitive adhesive, a thermal sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material 12 and, in this instance, heat also must be applied to effect the sealing. The term "bonding material" as used herein means any type of material or thing which can be used to effect the bonding or connecting of the two adjacent portion of the material or sheet of material as described herein.

Further, the bonding material 68 may also comprise one or more colors derived from dye, ink, or pigment previously described herein. Bonding materials 68, as described herein, are known in the art, and commercially available.

The bonding material 68, as previously described, is preferably a pressure sensitive adhesive, or, alternatively, a thermal-sensitive adhesive, or a cohesive. Such use of pressure sensitive adhesives is taught in U.S. Pat. No. 5,111,638, entitled, "Method for Wrapping an Object With a Material Having Pressure Sensitive Adhesive Thereon," and is hereby incorporated by reference herein. Adhesives, pressure sensitive adhesives, thermal-sensitive adhesives and cohesives are well known in the art and are commercially available.

The Embodiment of FIG. 3

Illustrated in FIG. 3 is a modified wrapping material 10a which is constructed exactly like the wrapping material 10 shown in FIGS. 1 and 2, and described in detail previously, except that the extension 28a forms an integral part of the sheet of material 12a.

The material 10a is used in the same methods of use as described below for all wrapping materials shown and described in detail herein.

The Embodiment of FIGS. 4–6

Illustrated in FIGS. 4–6 is a modified wrapping material 10b which is constructed exactly like the wrapping material 10 shown in FIGS. 1 and 2 and described in detail previously, except that the extension 28b is formed in a different abstract shape, and the extension 28b (FIGS. 5–6) is shown unattached to the sheet of material 12b, and the extension 28b has an extended width 67. Further, the extension 28b illustrates design indicia 36b which varies between the upper surface 30b and the lower surface 32b, and a portion of the upper surface 30b of the extension 28b has a bonding material 68 thereon.

In this embodiment, the extension 28b may be used with a pre-formed flower pot cover 38b' (not shown) or a hand-formed flower pot cover 38b' (FIGS. 22–23) to secure the pot cover 38b' around the flower pot 38b (FIGS. 24–25). That is, the extension 28b, or a portion thereof, may extend substantially, or completely, around the pot cover 38b' to secure the flower pot cover 38b' to the flower pot 38b. Further, at least a portion of the extension 28b may extend around the pot cover 28b' above the level of rim 49b of the flower pot 38b (not shown). Alternatively, the extension 28b may extend around the pot cover 38b' at the same level as the rim 49b of the flower pot 38b (FIG. 25). In another alternative, the extension 28b may extend around the pot cover 38b' below the rim 49b of the flower pot 38b FIG. 25). Finally, the extension 28b may extend substantially around the pot cover 38b' at more than 1 level of the flower pot 38b, that is, at multiple levels, to secure the flower pot cover 38b' over the flower pot 38b (FIG. 25). The method of use of the embodiment shown in FIGS. 4–6 will be described in detail below.

Figure 7:
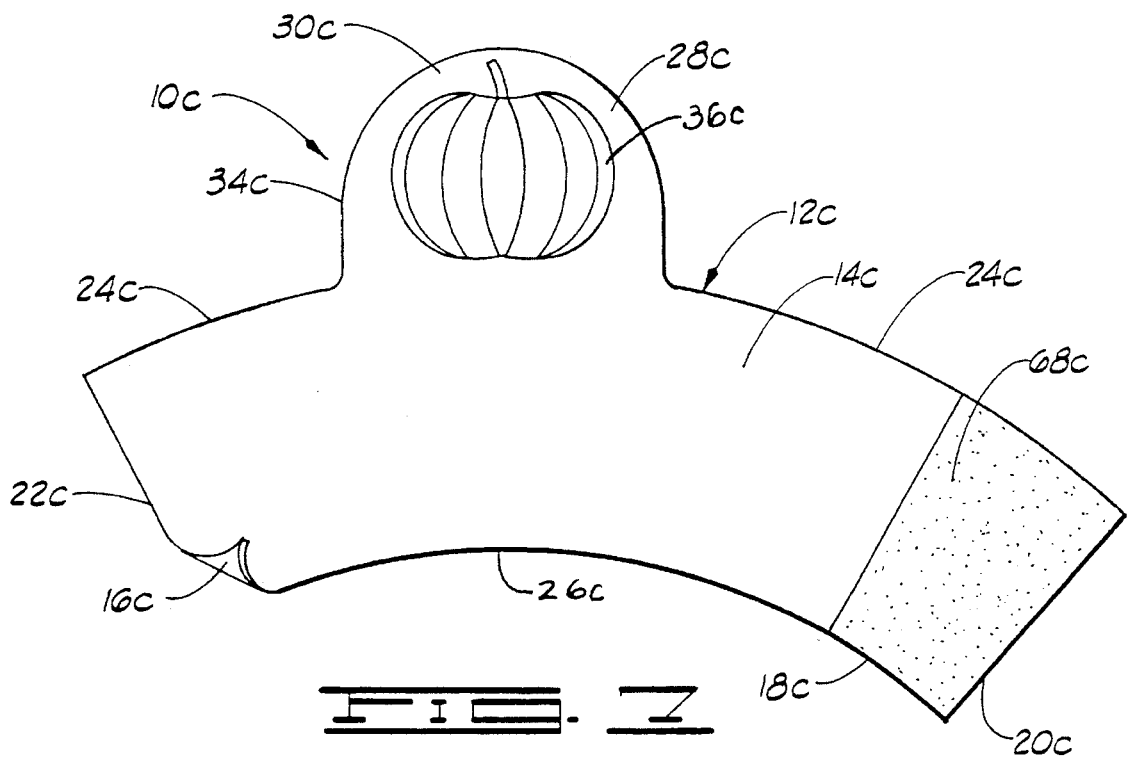
FIG. 7 is a perspective view of a modified wrapping material constructed exactly like the wrapping material of FIG. 3, but showing two arcuately curved sides of the sheet of material, and a bonding material disposed on a portion of the material.

The Embodiment of FIG. 7

Illustrated in FIG. 7 is a modified wrapping material 10c which is constructed exactly like the wrapping material 10 shown in FIGS. 1 and 2, and described in detail previously, except that two sides of the sheet of material 12c, namely, the third side 24c and the 4th side 26c are arcuately curved, and except that the extension 28c forms an integral part of the sheet of material 12c. A portion of the sheet of material 12c near the first side contains bonding material 68c.

The sheet of material 12c is utilized to wrap a flower pot 38c (FIG. 20–21). The method of use utilizing the sheet of material 12c to wrap a flower pot 38c will be described in detail below.

Figure 8:
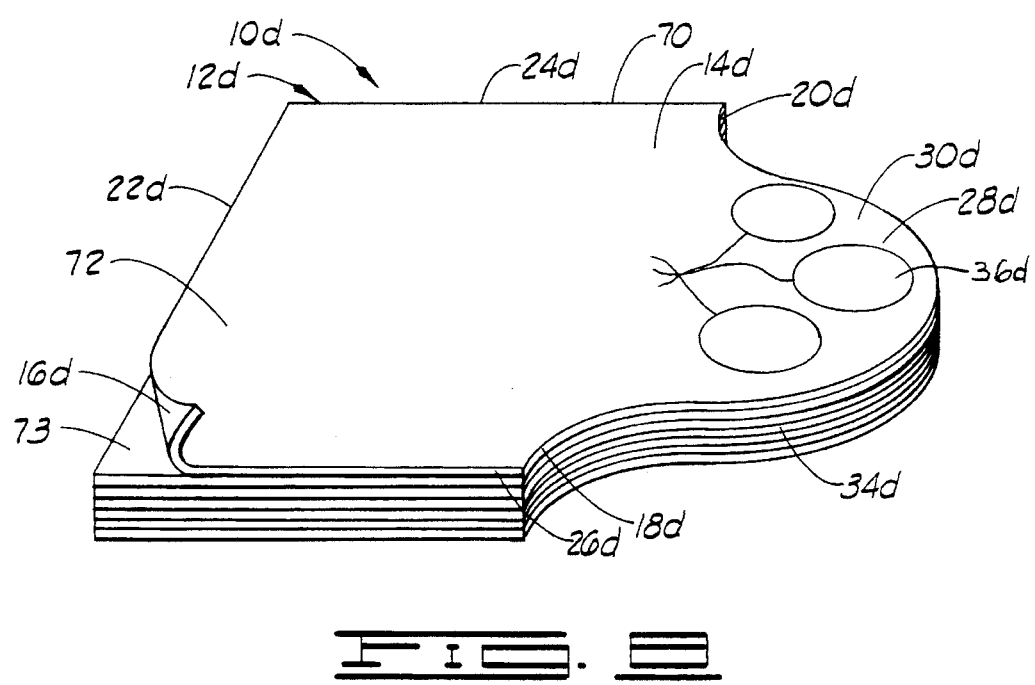
FIG. 8 is a perspective view of a modified wrapping material constructed exactly like the wrapping material of FIG. 3, but showing a plurality of sheets of material formed into a pad.

The Embodiment of FIG. 8

Illustrated in FIG. 8 is a modified wrapping material 10d which is constructed exactly like the wrapping material 10 shown in FIG. 1–2, and described in detail previously, except that the sheet of material 12d comprises a plurality of sheets of material 12d connected together to form a pad 70 of sheets of material 12d, and the extension 28d forms an integral part of the sheet of material 12d. The pad 70 comprises a plurality of sheets of material 12d stacked one on top of the other and positioned so that the periphery 18d, that is, the first sides 20d, the second sides 22d, the third sides 24d, and the fourth sides 26d of sheets of material 12d in the pad 70 generally are aligned.

Referring to FIG. 8, the pad 70 further comprises a top sheet of material 72 and a next sheet of material 73 disposed thereunder, the other sheets of material 12d being disposed under the next sheet of material 73 in the pad 70 of sheets of material 12d. Each sheet of material 12d in the pad 70 may have a bonding material 68 (not shown) disposed thereupon, near at least a portion of the periphery 18d of each sheet of material 12d, and each sheet of material 12d having a bonding material 68 thereon is bondingly connectable to a portion of another sheet of material 12d for cooperating to connect each of the sheets of material 12d into the pad 70. It will also be appreciated that each sheet of material 12d in the pad has an extension 28d which comprises an integral part of the sheet of material 12d. Alternatively, each sheet of material 12d in the pad may comprise a separate extension 28d which is bondingly attached and bondingly releasable from each sheet of material 12d in the pad 70 (not shown). In a further alternative, the extension 28d may comprise a separate pad 70 of extensions 28d, which are bondingly attached and bondingly releasable from each extension 28d in the pad 70, as described previously for the sheet of material 12d (not shown). In this alternative, the extension 28d would be attached separately to the sheet of material 12d.

The top sheet of material 72 is capable of being disconnected from the pad 70 of sheets of material 12d. When the top sheet of material 72 is disconnected, the next sheet of material 73 forms the new top sheet of material 72, and the sheet of material 12d lying under the new top sheet of material 72 forms a new next sheet of material 73.

A bonding material 68 (not shown) on each sheet of material 12d bondingly and releasably connects each sheet of material 12d to one other sheet of material 12d whereby one of the sheets of material 12d can be releasably disconnected from another sheet of material 12d by pulling the sheets of material 12d apart. Further, the bonding material 60 bondingly and releasably may connect each sheet of material 12d to portions of itself.

The Embodiments of FIGS. 9–11

Illustrated in FIGS. 9–11 is a modified wrapping material 10e which is constructed exactly like the wrapping material 10 shown in FIGS. 1–2, and described in detail previously, except that the wrapping material 10e comprises a roll 74 of sheets of material 12e contained within a dispenser 76 as shown in FIG. 9. The roll 74 contains a wrapping material 10e comprising a plurality of sheets of material 12e in the roll 74, the sheets of material 12e being connected by perforations to form the roll 74 (the sheet of material 12e and 12ee shown partially detached and turned upward for illustration purposes only). Such a roll 74 may be provided without a dispenser 76 as well (FIG. 10). Such rolls 74 permit one sheet of material 12e to be withdrawn from the roll 74, and the sheet of material 12e is detached or severed from the roll 74. Alternatively, the roll 74 may simply be formed as a continuous roll 74 without perforations, and the wrapping material 10e may be withdrawn from the roll 74 and a portion may be severed into separate sheets of material 12e by a serrated cutting edge (not shown) contained within the dispenser 76, or by a separate cutting element (not shown). Any number of sheets of material 12e may form the roll 74 as long as it is possible to withdraw at least one sheet of material 12e from the roll 74. It will be understood that the roll 74 may comprise only one sheet of material 12e, without the dispenser 76, as illustrated in FIG. 11.

It will also be understood that the sheet of material 12e, or plurality of sheets of material 12e which comprises the roll 74, whether or not contained within a dispenser 76, may contain, as an integral part of the sheet of material 12e an extension 28e, as shown in FIG. 10. It will also be understood that an extension 12e may be provided and attached to the sheet of material 12e separately.

The sheet of material 12e may be wrapped about a floral arrangement 50 or a flower pot 38. The sheet of material 12e, when wrapped about either a floral arrangement 50 or a flower pot 38, substantially wraps and encompasses the floral arrangement 50 or flower pot 38. Both of these methods of use are described in detail below.

The Embodiment and Method of Use of FIGS. 12–15

FIGS. 12–15 illustrate another embodiment and method of use of the present invention. The wrapping material 10f and sheet of material 12f illustrated in this embodiment and used in this method are constructed exactly the same as the wrapping material 10a and the sheet of material 12a shown in FIG. 3 and described in detail previously, except that a bonding material 68f is disposed on at least a portion of the upper surface 14f of the sheet of material 12f.

After the sheet of material 12f is withdrawn and detached from a roll 74 or a pad 70 of sheets of material 12f by any means described herein, an operator disposes the sheet of material 12f on a relatively horizontal surface (not shown), the lower surface 16f of the sheet of material 12f contacting the horizontal surface. Next, a flower pot 38 is provided, and the operator disposes the flower pot 38 on the upper surface 14f of the sheet of material 12f as shown in FIG. 13. The sheet of material 12f is then wrapped around the flower pot 38 by being formed and molded in an upward direction around the flower pot 38 by the operator as shown in FIGS. 14 and 15, at least one portion of the sheet of material 12f, such as the upper surface 14f and the bonding material 68f thereon contacts at least one other portion of the upper surface 14f, to form and shape the sheet of material 12f about the flower pot 38, the sheet of material 12f capable of retaining a wrapped shape. The sheet of material 12f is formed about the flower pot 38 and the sheet of material 12f forms a flower pot cover 38'. The formed flower pot cover 38' has an upper end 40', a lower end 42', and an outer surface 44' an opening 46' being formed in the flower pot cover 46' with a portion of the opening 46' intersecting the upper end 40' of the flower pot cover 38' forming an inner surface 48' the extension 28f of the sheet of material 12f and the design indicia 36f thereon forming a portion of the upper end 40' of the flower pot cover 38' adjacent said opening 40' wherein the flower pot cover 38' substantially surrounds and encompasses the flower pot 38, the flower pot opening 46 in corresponding alignment with the opening 46' in the flower pot cover 38' wherein a floral arrangement 50 or a potted plant 52 retained within the flower pot 32 is exposed through both the flower pot opening 46 and the flower pot cover opening 46'. The sheet of material 12f having an extension 28f with design indicia 36f thereon may extend generally a distance above the opening 46 in the flower pot 38. Alternatively, however, the extension 28f will not extend above the sheet of material 12f when formed into a flower pot cover 38'. It will be appreciated, however, that the sheet of material 12f may be pre-formed into a flower pot cover 38' by hand or by any means known in the art, before the sheet of material 12f is disposed about the flower pot 38.

Therefore, alternatively, the flower pot 38 is inserted by an operator into a pre-formed flower pot cover 38' constructed from the sheet of material 12f (as illustrated in FIGS. 16–19), the pre-formed flower pot cover 38' retaining its pre-formed shape, and substantially surrounding and encompassing the flower pot 38, as previously described, as well be described in further detail below. Methods of using sheets of material 12f to form into flower pot covers 38' and methods of making pre-formed flower pot covers 38' are covered in U.S. Pat. No. 4,773,182, entitled, "Article Forming System," and U.S. Pat. No. 4,897,031, entitled, "Article Forming System," both of which are hereby incorporated by reference herein.

It will also be appreciated that the base 78 of the flower pot cover 38' may vary in size and/or in shape. The "base," as used herein, means the portion of the flower pot cover 38' which surrounds the outer surface 44 of the flower pot 38 illustrated in FIGS. 14 and 15. These areas extend generally between the lower end 42' and the upper end 40' of the flower pot cover 38', and about the outer surface 44' and sometimes follows the contours of the outer surface 44 of the flower pot 38 (in this instance, the frusto-conical shape of the flower pot 38), before extending, as shown in FIGS. 14 and 15 outward, into a skirt. The base 78 of the flower pot cover 38' may be frusto-conical, round, cylindrical, reverse frusto-conical (an upside-down frusto-conical shape), or the base 78 of the flower pot cover 38' may have three sides, four sides, five sides, six sides, seven sides, eight sides, nine sides, ten sides, eleven sides, twelve sides, or any number of sides, or, alternatively, the base of the flower pot cover 38 may have a scalloped shape, a sinusoidal shape, a corrugated shape, an asymmetrical shape, or may comprise any combination of the shapes shown and/or described herein, or known in the art.

It will be understood that the extension 28f, shown as an integral part of the sheet of material 12f formed into a flower pot cover 38' and as an integral part of the flower pot cover 38' can be formed separately and attached separately to the sheet of material 12f, either before or after the sheet of material 12f is formed into a flower pot cover 38' as previously described, and as will be discussed in further detail below.

The Embodiments and Method of Use of FIGS. 16–19

In alternative embodiments and method shown in FIGS. 16–19, a flower pot 38g and a pre-formed flower pot cover 38g' constructed from (and exactly the same as) the wrapping material 10a and the sheet of material 12a shown in FIG. 3 and previously described in detail, is provided. The operator disposes the preformed flower pot cover 38g' (formed by any method described herein) on a relatively horizontal surface (not shown). The operator then takes the flower pot 38g and inserts the flower pot 38g into the opening 46g' provided in the pre-formed flower pot cover 38g' to receive the flower pot 38g, the pre-formed flower pot cover 38g' substantially surrounding and encompassing the outer surface 44g of the flower pot 38g, as previously described herein.

In an alternative embodiment (not shown), the sheet of material 12g is a pre-formed flower pot 38g, instead of a preformed flower pot cover 38g'. In this embodiment, a flower pot 38g is formed from a wrapping material 10a, as described herein, capable of forming and retaining the shape of a flower pot 38g for inserting a floral arrangement 50 or a plant 52 into. The flower pot 38g is formed from a sheet of material 12g. The sheet of material 12g is sized to form a flower pot 38g, the sheet of material 12g capable of retaining the pre-formed shape of a flower pot 38g, wherein the sheet of material 12g is pre-formed into a flower pot 38g having an upper end 40g, a lower end 42g, and an outer surface 44g, an opening 46g being formed in the flower pot 38g with a portion of the opening 46g intersecting the upper end 40g of the flower pot 38g forming an inner surface 48g, the extension 28g of the sheet of material 12g and the design indicia 36g thereon forming a portion of the upper end 40g of said flower pot cover 38g adjacent said opening 40g, the flower pot opening 46g being sized and shaped for receiving and containing a floral arrangement 50 or a plant 52 therein, said floral arrangement 50 or plant 52 being retained in the opening 46g of the flower pot 38g, wherein the flower pot 38g substantially surrounds and encompasses the floral arrangement 50 or the plant 52, and wherein at least a portion of a floral arrangement 50 or plant 52 retained within the flower pot 38g is exposed through the opening 46g.

The flower pot 38g also has a "base 78," which is exactly the same as the base 78 described above for a flower pot cover 78, which may also vary in shape and configuration, as previously described for the "base" of the flower pot cover 78'.

It will be understood that the extension 28g, shown as in integral part of the pre-formed flower pot cover 38g' and as an integral part of the pre-formed flower pot 38g, can be attached separately to either the pre-formed flower pot cover 38g' or the flower pot 38g, either before or after a floral arrangement 50 or potted plant 52 is disposed therein.

The method of use of this alternate embodiment (not shown) is similar to the one described above. In this instance, a floral arrangement 50 or a plant 52 is disposed into a flower pot 38g.

A flower pot 38g formed from the wrapping material 10a capable of forming and retaining the shape of a flower pot 38g for disposing a floral arrangement 50 or plant 52 into is provided. The flower pot 38g is formed from a sheet of material 12g, as described above. A floral arrangement 50 or a plant 52 sized to be disposed in the flower pot opening 46g is provided. An operator then disposes the floral arrangement 50 or the plant 52 into the opening 46g of the flower pot 38g, the flower pot 38g receiving and retaining the floral arrangement 50 or plant 52 therein, the flower pot 38g substantially surrounding and encompassing a substantial portion of the floral arrangement 50 or plant 52, the flower pot 38g retaining the floral arrangement 50 or the plant 52 adjacent the inner surface 48g of the flower pot 38g, wherein at least a portion of the floral arrangement 50 or the plant 52 retained within the flower pot 38g is exposed through the opening 46g in the flower pot 38g and wherein the extension 28g and the design indicia 36g thereon extends generally a distance above the opening 46g in the flower pot 38g. Alternatively, however, the extension 28g will not extend above the flower pot 38g.

Potting soil, floral foam, or any other material used to encompass live floral arrangements or plants, or, cut floral arrangements or plants may also be disposed, along with the floral arrangement 50 or plant 52 in the flower pot 38g, such material being disposed through the opening 46g in the flower pot 38g and being retained adjacent the inner surface 48g or the flower pot 38g. Such potting soil, floral foam, and like materials are well known in the art, and are commercially available.

The Embodiment and Method of FIGS. 20–21

FIGS. 20–21 illustrate another embodiment and method of use of the present invention. The wrapping material 10h and sheet of material 12h illustrated in this embodiment and used in this method are constructed exactly the same as the wrapping material 10c and the sheet of material 10c shown in FIG. 7 and described in detail previously.

The sheet of material 12h (which may be provided in pads 70 of sheets of material 12, as previously described herein) is provided. The sheet of material 12h is disposed about a flower pot 38h by wrapping the sheet of material 12h about the flower pot 38h, to, in a preferable embodiment, conform to the outer surface 44h of the flower pot 38h, as shown in FIGS. 20–21. The sheet of material 12h wraps about and is adjacent to the outer surface 44h of the flower pot 38h. The bonding material 68h on the sheet of material 12h connects to the sheet of material 12h to secure the sheet of material 12h about the flower pot 38h.

The sheet of material 12h may also have a special area 79 provided for a personalized message to be written or printed on the sheet of material 12h, to act as a greeting to the recipient. "Special area" means a portion of the surface of the sheet of material 12h (either the upper surface 14h or the lower surface 16h, whichever does not lie adjacent to the flower pot 38h) which permits writing or printing thereon. Such surfaces, formed from various material described herein, are well-known in the art. Further, it will be appreciated that all embodiments described and illustrated herein may also be provided with a special area 79.

The Embodiment and Method of Use of FIGS. 22–25

FIGS. 22–25 illustrate another embodiment and method of use of the present invention. The sheet of material 12i and the extension 28i illustrated in this embodiment and used in this method of use are constructed exactly the same as the sheet of material 12b and extension 28b shown in FIGS. 4–6 and described in detail previously, except that a bonding material 68i has been disposed on at least a portion of the upper surface of the sheet of material 12i, and except that the sheet of material 12i may be preformed into a flower pot cover 38i' as previously described herein The sheet of material 12i is disposed on a surface, and is formed by hand about a flower pot 38i (FIGS. 22 and 23), or is pre-formed into the shape of a flower pot cover 38i' (FIG. 23), and the flower pot 38i is disposed into the flower pot cover 38i', as previously described herein. The extension 28i is then applied to the flower pot cover 38i, to secure the flower pot cover 38i' about the flower pot 38i, at least one portion of the extension 28i contacting, or overlapping at least one other portion of the extension 28i, to secure the flower pot cover 38i' about the flower pot 38i (FIGS. 2414 25). Alternatively, at least one portion of the extension 28i should extend substantially around the flower pot cover 38i.

It will be appreciated that when the sheet of material 12i is formed by hand about a flower pot 38i, the sheet of material 12i may not sustain the shape of a flower pot cover 38i' without the application of the extension 28i, which secures the sheet of material 12i about the flower pot 38i, and bondingly restricts, via the bonding material 68i, the shape of the sheet of material 12i, causing the sheet of material 12i to retain the shape of a flower pot cover 38i' while the extension 28i is bondingly engaged with the sheet of material 12i. It will also be understood that this result is also achieved when an extension 28i is used to secure a sheet of material 12i about a flower pot 38i when the sheet of material 12i has no bonding material 68i disposed thereon.

The extension 28i may wrap around the flower pot cover 38i' at or near the rim 49i of the flower pot 38i (FIG. 25) or, the extension may wrap around the flower pot cover 38i' above the level of the opening 46i in the flower pot 38i (above the rim 49i of the flower pot 38i) (not shown). The extension 28i may also wrap the sheet of material 12i below the rim 49i of the flower pot 38i (FIG. 25). It will be appreciated that the extension 28i may have one or more portions which wrap about the sheet of material 12i (FIGS. 24–25).

Finally the extension 28i may be used to wrap about only a flower pot 38i (not shown). Or, alternatively, the extension 28i may be used to wrap about a sheet of material 12 which is formed, by any method disclosed herein, into a flower pot 38.

The Embodiments and Method of Use of FIGS. 26–29

In a general method of use of the embodiments illustrated in FIGS. 26–29, the wrapping material 10j comprises a plurality of sheets of material 12j in pad 70j and a floral arrangement 50, as previously described, are provided. The wrapping material 10j and the sheet of material 12j are constructed exactly like the wrapping material 10d and sheet of material 10d shown in FIG. 8 and described in detail previously, except that the sheet of material 12j also has a bonding material 68j disposed thereon. The floral arrangement 50 is placed on a sheet of material 12j in the pad 70j, the sheet of material 12j being sized to wrap about and substantially surround and encompass a floral arrangement 50. The sheet of material 12j is wrapped about the floral arrangement 50, the sheet of material 12j simultaneously disconnecting from the pad 70j of sheets of material 12j as the sheet of material 12j is wrapped about the floral arrangement 50. A portion of the sheet of material 12j, such as the second side 22j of the sheet of material 12j, overlaps at least one other portion of the sheet of material 12j. The overlapping portions of the sheet of material 12j are bonded to the sheet of material 12j by their contact with the bonding material 68j on the upper surface 14j which bondingly connects to the overlapping portions of the sheet of material 12j, whereby the second side 22j of the sheet of material 12j is bonded to overlapping portions of the sheet of material 12j generally between the third side 24j and the fourth side 26j of the sheet of material 12j whereby there are no loose flaps formed by unbonded portions of the sheet of material 12j. The sheet of material 12j substantially encompasses and surrounds a substantial portion of the flower portion 54 of the floral arrangement 50 and a substantial portion of the stem portion 56 of the floral arrangement 50. The sheet of material 12j is held about the floral arrangement 50 by the bonding of the overlapping portions of the sheet of material 12j, the sheet of material 12j being tightly wrapped about the stem portion 56 of the floral arrangement 50, the extension 28j of the sheet of material 12j and the design indicia 36j thereon extending generally a distance above the flower portion 34 of the floral arrangement 50. However, it will be appreciated that the extension 28j in an alternative embodiment, may not extend above the flower portion 34 of the floral arrangement 50.

The sheet of material 12j wrapped about the floral arrangement 50 forms a wrapping which may be a cylindrically shaped wrapping (FIG. 29) or which may be a conically-shaped wrapping, or which may comprise other geometric forms (square, rectangular, and the like) or non-geometric or asymmetrical formed wrappings. The wrapping has an opening extending through a lower end 80 thereof and an opening extending through the upper end 82 thereof with the stem portion 56 of the floral arrangement 50 extending through the opening in the lower end 80 and the flower portion 54 of the floral arrangement 50 being exposed near the opening in the upper end 82 thereof, the upper end 82 of the wrapping being loosely wrapped about the flower portion 54 of the floral arrangement 50.

FIGS. 26–29 show one specific method of use. A plurality of sheets of material 12j in a pad 70j, and a floral arrangement 50, as described above, are provided. A floral arrangement 50 is disposed on the top sheet of material 72j in a pad 70j of sheets of material 12j. An operator then lifts a portion of the top sheet 70j (generally the portion near the second side 22j) and places the lifted portion over a portion of the floral arrangement 50, as shown in FIG. 27. In this position, the top sheet of material 72j is rolled over the floral arrangement 70j, and the top sheet of material 72j and the floral arrangement 50 are then rolled in a general direction 84 (FIGS. 27–28) whereby the top sheet of material 72j and the floral arrangement 50 contained therein are lifted from the next sheet of material 73*j*, the floral arrangement 50 being rolled into the top sheet of material 72*j*, thereby rolling the top sheet of material 72*j* generally about the floral arrangement 50 and containing and substantially encompassing the floral arrangement 50 within the top sheet of material 72*j*.

The top sheet of material 72*j* and the floral arrangement 50 are continued rolled in a rolling direction 86 and in the direction 84 generally toward the first side 20*j* of the top sheet of material 72*j* until the floral arrangement 50 is disposed generally adjacent the first side 20*j* of the top sheet of material 72*j*, as shown in FIG. 28. In this position, the operator continues to roll the top sheet of material 72*j* and the floral arrangement 50 disposed thereon in the rolling direction 86 and in the general direction 84 thereby lifting the top sheet of material 72*j* from the next sheet of material 73*j* and the bonding material 68*j* thereon, the next sheet of material 73*j* generally beneath the top sheet of material 72*j* and simultaneously disconnecting the top sheet of material 72*j* from the bonding material 68*j* connection between the top sheet of material 72*j* and the next sheet of material 73*j*. The adjacent lower surface 16*j* of the second side 22*j* of the top sheet of material 72*j* is then bondingly connected to the bonding material 68*j* on the upper surface 14*j* of the top sheet of material 72*j* thereby securing the top sheet of material 72*j* and securely wrapping the floral arrangement 50, as shown in FIG. 29.

When the top sheet of material 72*j* has been secured about the floral arrangement 50 in the manner just described, the next sheet of material 73*j*, generally under the top sheet of material 72*j*, then provides a new top sheet of material 72*j*, the sheet of material 12*j* under the new top sheet of material 72*j* providing a new next sheet of material 73*j*, and the process can be repeated for wrapping additional or other floral groupings.

It will be appreciated that the sheet of material 12*j* used to wrap a floral arrangement 50 may be provided, as described above, as a top sheet of material 72*j* in a pad 70*j* of sheets of material 12*j*, or as a single sheet of material 12*j* severed from a roll 74, a sheet of material 12*j* removed from a roll 74 of sheets of material 12 in a dispenser 76 (FIG. 9 showing a sheet of material partially detached), a single sheet of material 17*j* (FIG. 1), or as one or more sheets of material 12*j* rolled into a roll 74*j* (FIG. 11).

Figure 31:
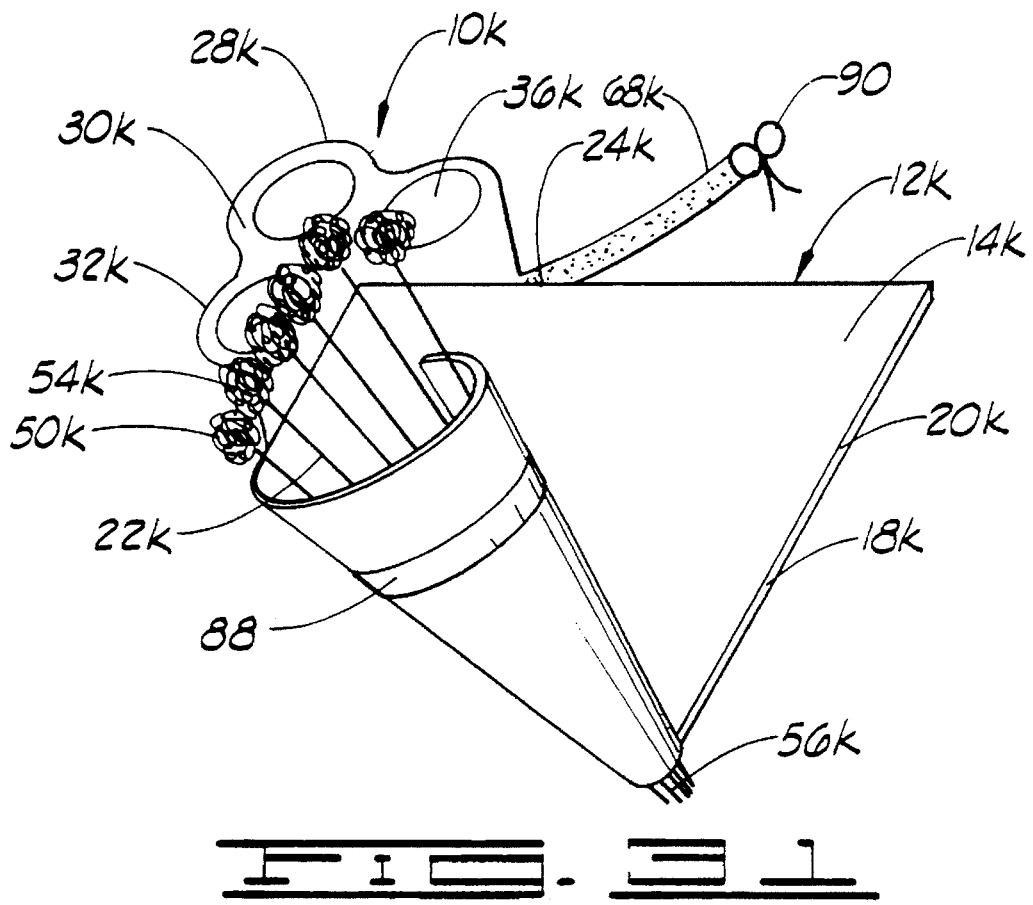
FIG. 31 is a perspective view of the wrapping material of FIG. 30, showing a partially wrapped floral arrangement.
Figure 32:
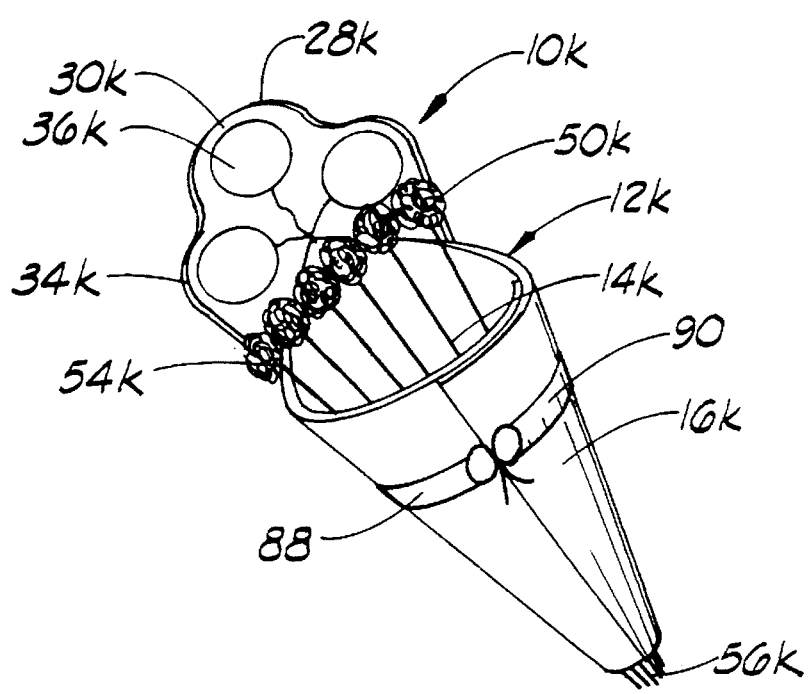
FIG. 32 is a perspective view of the wrapping material of FIG. 30, showing a wrapped floral arrangement.

The Method of Use of FIGS. 30–32

FIGS. 30–32 illustrate another embodiment and method of use of the present invention. The wrapping material 10*k* and the sheet of material 12*k* shown in this embodiment and used in this method is constructed exactly the same as the wrapping material 10 and the sheet of material 12 shown in FIGS. 1–2, except that the extension 28*k* has a first portion 88 and a second portion 90 which extend beyond the first side 20*k* and the second side 22*k* of the sheet of material respectively, and except that the extension 28*k* is disposed at the junction of the second side 22*k* and the third side 24*k* of the sheet of material 12*k*. A floral arrangement 50*k* is disposed upon the sheet of material 12*k*, the floral arrangement 50*k* placed diagonally upon the upper surface 14*k* of the sheet of material 12*k*, as shown in FIG. 30.

The sheet of material 12*k* is then wrapped in a manner similar to the one described above for the sheet of material 12*j*. The only difference being that the floral arrangement 50 is disposed diagonally on the sheet of material 12*k*, that is, the flower portion 54 is disposed near the junction of the second side 22*k* and the third side 24*k* of the sheet of material, and the stem portion 56 is disposed near the junction of the first side 20*k* and the fourth side 26*k* of the sheet of material 12*k*. The second side 22*k* is lifted near the corner of its junction with the fourth side 26*k*, and is placed at a diagonal angle across the floral arrangement 50*k*, as shown in FIG. 31. The sheet of material 12*k* is then rolled in a manner identical to that previously described for the top sheet of material 72*j* except that the sheet of material 12*k* does not release from a next sheet of material 73*j*. The wrapping which is formed from the sheet of material 12*k* substantially surrounds and encompasses the floral arrangement 50*k*, as previously shown and described above in detail, except that the wrapping forms a conical, or, alternatively, a frusto-conically shaped wrapping. It will be appreciated however, that the wrapping may form other shapes, such as cylindrical, or other geometric, non-geometric, or asymmetrical forms, as previously described While the sheet of material 12*k* does not have a bonding material thereon, and will not bondingly connect and bond to like portions of the sheet of material 12*k*, the sheet of material 12*k* still acts to substantially wrap and encompass the floral arrangement, due to the bonding material 68*k* disposed on at least a portion of the upper surface 30*k* of the extension 28*k* on the first portion 88 and the second portion 90, which bondingly connects to the sheet of material 12*k* to hold the sheet of material 12*k* in the wrapped form.

It will be appreciated that the wrapping material 10*k* may be provided in any manner described herein.

Changes may be made in the embodiments of the invention described herein, or in parts or elements of the embodiments described herein, or in the sequence of steps of the methods described herein without departing from the spirit and/or scope of the invention as defined in the following claims.

What is claimed is:

1. A wrapping method comprising the steps of:

providing a sheet of material having an upper surface, a lower surface and an outer periphery;

providing an extension having a design indicia thereon, the extension sized smaller than an outer diameter of a pot;

providing a pot having an upper end, a lower end and an outer peripheral surface;

wrapping the sheet of material about the pot whereby the sheet of material substantially surrounds and encompasses the outer peripheral surface of the pot, the sheet of material thereby forming a wrapping;

positioning the extension on the wrapping such that the extension extends a distance away from the wrapping thereby effectively displaying the design indicia on the extension, the extension extending about only a portion of the outer peripheral surface of the wrapping; and connecting the extension to the wrapping.

2. The method of claim 1 wherein in the step of providing a sheet of material, the sheet of material is sized and shaped whereby a portion of the sheet of material overlaps another portion of the sheet of material when the sheet of material is wrapped about the pot to form the wrapping.

3. The method of claim 1 wherein in the step of providing a pot, the pot further comprises a flower pot.

4. The method of claim 1 wherein in the step of connecting the extension to the wrapping, the extension is connected to the wrapping such that the wrapping is secured about the pot.

5. A decorative method comprising the steps of:

providing an extension having a design indicia thereon, the extension sized smaller than an outer diameter of a pot;

providing a pot having an upper end, a lower end and an outer peripheral surface;

disposing the extension on the pot;

positioning the extension on the pot whereby the extension extends a distance away from the pot for displaying the design indicia, the extension extending about only a portion of the outer peripheral surface of the pot; and connecting the extension to the pot.

6. The method of claim 5 wherein in the step of providing an extension, the extension is further defined as being integrally formed with a sheet of material, the sheet of material being sized to wrap at least a portion of the outer peripheral surface of a pot, the sheet being positioned such that the extension extends the distance away from the sheet of material for displaying the design indicia thereon when the sheet of material is wrapped about at least a portion of the pot.

7. The method of claim 5 wherein in the step of providing an extension, the extension wraps substantially about at least a portion of the outer peripheral surface of the pot, at least one portion of the extension overlapping at least one other portion of the extension.

8. The method of claim 5 wherein in the step of providing a pot, the pot further comprises a flower pot.

9. The method of claim 5 wherein in the step of providing an extension, the extension further comprises a sheet of material, and wherein in the step of disposing the extension on the pot, the step further comprises first wrapping the sheet of material about at least a portion of the pot, thereby forming a wrapping.

10. The method of claim 9 wherein the sheet of material is sized and shaped whereby a portion of the sheet of material overlaps another portion of the sheet of material when the sheet of material is wrapped about the pot to form the wrapping.

11. A wrapping method comprising the steps of:

providing a pre-formed pot cover formed from a sheet of material having an upper surface, a lower surface and an outer periphery, the pre-formed pot cover further comprising an open upper end, a closed lower end, and an outer peripheral surface, the pre-formed pot cover further having an extension which is integrally formed with the pre-formed pot cover, the extension being sized and formed on the pre-formed pot cover such that the extension extends a distance away from the pre-formed pot cover, the extension having a design indicia thereon;

providing a pot having an upper end, a lower end and an outer peripheral surface;

disposing the pot into the pre-formed pot cover whereby the pre-formed pot cover substantially surrounds and encompasses the outer peripheral surface of the pot, the pre-formed pot cover forming a wrapping; and positioning the extension such that the extension extends a distance away from both the wrapping and the pot thereby effectively displaying the design indicia on the extension.

12. The method of claim 11 wherein in the step of providing a sheet of material, the sheet of material is sized and shaped whereby a portion of the sheet of material overlaps another portion of the sheet of material when the sheet of material is wrapped about the pot to form the wrapping.

13. The method of claim 11 wherein in the step of providing a pot, the pot further comprises a flower pot.

14. A wrapping method comprising the steps of:

providing a sheet of material having an upper surface, a lower surface and an outer periphery;

providing an extension having a design indicia thereon, the extension sized smaller than an outer diameter of a pot;

providing a pot having an upper end, a lower end and an outer peripheral surface;

positioning the extension on the pot such that the extension extends a distance away from the pot thereby effectively displaying the design indicia on the extension, the extension extending about only a portion of the outer peripheral surface of the pot;

connecting the extension to the pot; and wrapping the sheet of material about the pot whereby the sheet of material substantially surrounds and encompasses the outer peripheral surface of the pot, the sheet of material thereby forming a wrapping.

15. A wrapping method comprising the steps of:

providing a sheet of material having an upper surface, a lower surface and an outer periphery;

providing an extension having a design indicia thereon, the extension sized smaller than an outer diameter of a pot;

providing a pot having an upper end, a lower end and an outer peripheral surface;

wrapping the sheet of material about the pot whereby the sheet of material covers at least a portion of the outer peripheral surface of the pot, the sheet of material thereby forming a wrapping;

positioning the extension on the wrapping such that the extension extends a distance away from the wrapping thereby effectively displaying the design indicia on the extension, the extension extending about only a portion of the outer peripheral surface of the wrapping; and connecting the extension to the wrapping.

16. A wrapping method comprising the steps of:

providing a sheet of material having an upper surface, a lower surface and an outer periphery;

providing an extension having a design indicia thereon, the extension sized smaller than an outer diameter of a pot;

providing a pot having an upper end, a lower end and an outer peripheral surface;

positioning the extension on the pot such that the extension extends a distance away from the pot thereby effectively displaying the design indicia on the extension, the extension extending about only a portion of the outer peripheral surface of the pot;

connecting the extension to the pot; and wrapping the sheet of material about the pot whereby the sheet of material covers at least a portion of the outer peripheral surface of the pot, the sheet of material thereby forming a wrapping.

17. A wrapping method comprising the steps of:

providing a sheet of material having an upper surface, a lower surface and an outer periphery;

providing an extension having a design indicia thereon, the extension having an upper surface, a lower surface, and an outer periphery, at least a portion of the outer periphery of the extension following the outline of the design indicia and thereby forming at least a portion of the design indicia;

providing a pot having an upper end, a lower end and an outer peripheral surface;

wrapping the sheet of material about the pot whereby the sheet of material substantially surrounds and encompasses the outer peripheral surface of the pot, the sheet of material thereby forming a wrapping;

positioning the extension on the wrapping such that the extension extends a distance away from the wrapping thereby effectively displaying the design indicia on the extension; and connecting the extension to the wrapping.

18. A decorative method comprising the steps of:

providing an extension having a design indicia thereon, the extension having an upper surface, a lower surface, and an outer periphery, at least a portion of the outer periphery of the extension following the outline of the design indicia and thereby forming at least a portion of the design indicia;

providing a pot having an upper end, a lower end and an outer peripheral surface;

disposing the extension on the pot;

positioning the extension on the pot whereby the extension extends a distance away from the pot for displaying the design indicia; and connecting the extension to the pot.

19. A wrapping method comprising the steps of:

providing a sheet of material having an upper surface, a lower surface and an outer periphery;

providing an extension having a design indicia thereon, the extension having an upper surface, a lower surface, and an outer periphery, a substantial portion of the outer periphery of the extension following the outline of the design indicia and thereby forming at least a portion of the design indicia;

providing a pot having an upper end, a lower end and an outer peripheral surface;

wrapping the sheet of material about the pot whereby the sheet of material substantially surrounds and encompasses the outer peripheral surface of the pot, the sheet of material thereby forming a wrapping;

positioning the extension on the wrapping such that the extension extends a distance away from the wrapping thereby effectively displaying the design indicia on the extension; and connecting the extension to the wrapping.

20. A decorative method comprising the steps of:

providing an extension having a design indicia thereon, the extension having an upper surface, a lower surface, and an outer periphery, a substantial portion of the outer periphery of the extension following the outline of the design indicia and thereby forming at least a portion of the design indicia;

providing a pot having an upper end, a lower end and an outer peripheral surface;

disposing the extension on the pot;

positioning the extension on the pot whereby the extension extends a distance away from the pot for displaying the design indicia; and connecting the extension to the pot.

* * * * *

UNITED STATES PATENT AND TRADEMARK OFFICE
CERTIFICATE OF CORRECTION

PATENT NO. : 5,544,469  Page 1 of 3
DATED : August 13, 1996
INVENTOR(S) : Donald E. Weder et al.

It is certified that error appears in the above-identified patent and that said Letters Patent is hereby corrected as shown below:

Cover Sheet, under 'Related U.S. Application Data', Section '[63]', line 3, please delete "May 21", and substitute therefor --Apr. 9--.

Cover Sheet, under 'Related U.S. Application Data', Section '[63]', line 6, after 'abandoned', please delete "which", and substitute therefor --said 893,586--.

Column 1, line 11, please delete "May 21", and substitute therefor --Apr. 9--.

Column 1, lines 12-14, please delete "METHOD FOR WRAPPING AN OBJECT WITH A MATERIAL HAVING PRESSURE SENSITIVE ADHESIVE THEREON", and substitute therefor --METHOD FOR WRAPPING A FLORAL GROUPING--.

Column 4, line 22, after 'round opening', please delete "48", and substitute therefor --46--.

Column 6, line 34, please delete "includes", and substitute therefor --include--.

Column 9, line 20, please delete "60", and substitute therefor --68--.

Column 10, line 28, after 'cover', please delete "46'", and substitute therefor --38--.

UNITED STATES PATENT AND TRADEMARK OFFICE
CERTIFICATE OF CORRECTION

PATENT NO. : 5,544,469

DATED : August 13, 1996

INVENTOR(S) : Donald E. Weder et al.

It is certified that error appears in the above-identified patent and that said Letters Patent is hereby corrected as shown below:

Column 10, line 32, after 'said opening', please delete "40'", and substitute therefor --46'--.

Column 10, line 37, after 'flower pot', please delete "32", and substitute therefor --38--.

Column 10, line 50, after 'material', please delete "12f", and substitute therefor --12g--.

Column 11, line 59, after 'said opening', please delete "40g", and substitute therefor --46g--.

Column 12, line 53, after 'material', please delete "10c", and substitute therefor --12c--.

Column 13, line 31, after '(FIGS.', please delete "2414", and substitute therefor --24---.

Column 14, line 5, after 'of material', please delete "10d", and substitute therefor --12d--.

Column 14, line 37, after 'portion', please delete "34", and substitute therefor --54--.

Column 14, line 39, after 'flower portion', please delete "34", and substitute therefor --54--.

Column 14, line 60, after 'top sheet', please delete "70j", and substitute therefor --72j--.

UNITED STATES PATENT AND TRADEMARK OFFICE
CERTIFICATE OF CORRECTION

PATENT NO. : 5,544,469
DATED : August 13, 1996
INVENTOR(S) : Donald E. Weder et al.

It is certified that error appears in the above-identified patent and that said Letters Patent is hereby corrected as shown below:

Column 15, line 8, please delete "continued", and substitute therefor --continually--.

Column 15, line 43, after 'sheet of material', please delete "17j", and substitute therefor --12j--.

Column 15, line 44, after 'rolled into a roll', please delete "74j".

Column 16, line 17, after 'previously described', please insert --.--.

Signed and Sealed this

Eighth Day of July, 1997

Attest:

BRUCE LEHMAN

Attesting Officer

Commissioner of Patents and Trademarks